United States Patent [19]
Manning

[11] Patent Number: 6,043,826
[45] Date of Patent: Mar. 28, 2000

[54] TRANSFERRING OUTLINE FONTS TO DEVICES REQUIRING RASTER FONTS

[75] Inventor: Raymond A. Manning, Redmond, Wash.

[73] Assignee: Microsoft Corporation, Redmond, Wash.

[21] Appl. No.: 08/922,166

[22] Filed: Sep. 2, 1997

[51] Int. Cl.[7] ........................................................ G06F 3/14
[52] U.S. Cl. ............................ 345/467; 345/468; 345/471
[58] Field of Search ......................... 707/1–10, 100–104, 707/200–206, 519, 542; 345/136, 144, 443, 467–471, 507, 509, 147, 441, 442

[56] References Cited

U.S. PATENT DOCUMENTS

| | | | |
|---|---|---|---|
| 5,586,241 | 12/1996 | Bauermeister et al. | 345/467 |
| 5,659,336 | 8/1997 | Patrick et al. | 345/507 |
| 5,790,126 | 8/1998 | Ballard et al. | 345/468 |
| 5,859,648 | 1/1999 | Moore et al. | 345/471 |
| 5,867,173 | 2/1999 | Ballard et al. | 345/468 |

*Primary Examiner*—Ruay Lian Ho
*Attorney, Agent, or Firm*—Lee & Hayes, PLLC

[57] ABSTRACT

A computer system in accordance with the invention includes a primary desktop computer and an auxiliary portable computer. The two computers are configured to work together—documents such as word processing documents are at times downloaded from the desktop computer for viewing and editing on the portable computer. However, the desktop computer uses TrueType outline fonts, while the portable computer uses raster fonts. The desktop computer includes a conversion program that is automatically invoked when the user copies an outline font file to the portable computer. The conversion program makes calls to the graphics device interface of the desktop computer to render outline character glyphs to a bitmap. The resulting bitmap is used as the basis of a rasterized character glyph. A set of glyphs is converted in this manner and compiled into a raster font file. The raster font file is then copied to the font folder of the portable computer and is used by the portable computer when displaying and editing documents created on the desktop computer.

12 Claims, 5 Drawing Sheets

TRANSFERRING OUTLINE FONTS TO DEVICES REQUIRING RASTER FONTS

TECHNICAL FIELD

This invention relates to systems in which resources including fonts are transferred from a primary computer for use on an auxiliary computer such as a palmtop or other portable computer.

BACKGROUND OF THE INVENTION

The Windows CE operating system was designed by Microsoft Corporation for limited-resource computers such as palmtop and other portable computers. Because of the limited amount of memory in such computers, Windows CE supports raster fonts rather than the more flexible TrueType fonts that are supported by Microsoft's desktop operating systems such as the Windows 95 and Windows NT operating systems.

TrueType is an outline font technology introduced in 1991 as a means of including high-grade fonts within the Apple Macintosh and Microsoft Windows operating systems. TrueType is a WYSIWYG font technology, which means that the printed output of TrueType fonts is identical to what appears on the screen.

TrueType consists of two parts: the so-called "engine" built into the operating system that does the work of generating and displaying the fonts, and the fonts themselves, which are stored in separate files on disk and called into use as needed. Because the fonts are stored separately, a user can add additional TrueType fonts to his or her system simply by adding additional font files. TrueType is also built into some peripheral devices—primarily printers—to help printers generate and print the individual characters, thus speeding up the printing process.

TrueType fonts are outline fonts; that is, the shapes of the characters are defined in terms of mathematically generated lines and curves rather than by patterns of dots. The advantage of outline fonts is that characters can be efficiently scaled to any size.

Raster fonts, in contrast, represent characters as bitmaps—patterns of pixels or dots. One significant disadvantage of raster fonts is they cannot be effectively scaled to different sizes—a single font is normally used only for a single character size. An advantage, however, is that a raster font of a particular character size is usually smaller than a corresponding TrueType font. Furthermore, the support software required to render and display raster fonts requires less memory and executes more quickly than the corresponding support software for rendering and displaying TrueType outline fonts.

The decision not to support TrueType fonts in the Windows CE environment was not without drawbacks, however. Connectivity is a key feature of Windows CE and of the computers that run Windows CE. Typically, a Windows CE computer is used in conjunction with a primary desktop computer. Documents and other files are downloaded to the palmtop computer, and the palmtop computer is used to access, maintain, and modify the documents and files when the desktop computer is not available. Extensive synchronization capabilities have been built into the Windows CE operating system as a further convenience for those who use their portable computers in conjunction with a more conventional desktop computer.

A great number of files that are created on a Windows 95 or Windows NT computer make use of TrueType fonts—fonts that are unavailable on a portable computer running Windows CE. When documents utilizing TrueType fonts are downloaded to a Windows CE device and loaded into a resident program such as a word processor, the TrueType font information is retained in the document so that it can be restored when the document is returned to the desktop computer. While the document is displayed and used on the Windows CE device, however, any non-supported font such as a TrueType font is mapped for display purposes to the closest matching raster font available on the Windows CE computer.

The disadvantage to this scheme is that characters often do not appear as they were intended to appear when they are viewed on the Windows CE portable computer. The invention remedies this problem.

SUMMARY OF THE INVENTION

The invention provides a way to transfer outline fonts to portable computers such as those described above that use only raster fonts. Specifically, the invention uses the graphics device interface of a desktop computer to create bitmaps of individual glyphs of an outline font. The bitmaps are then collected and formatted in a raster font file, which is then transferred to the portable computer.

DETAILED DESCRIPTION

Figure 1:
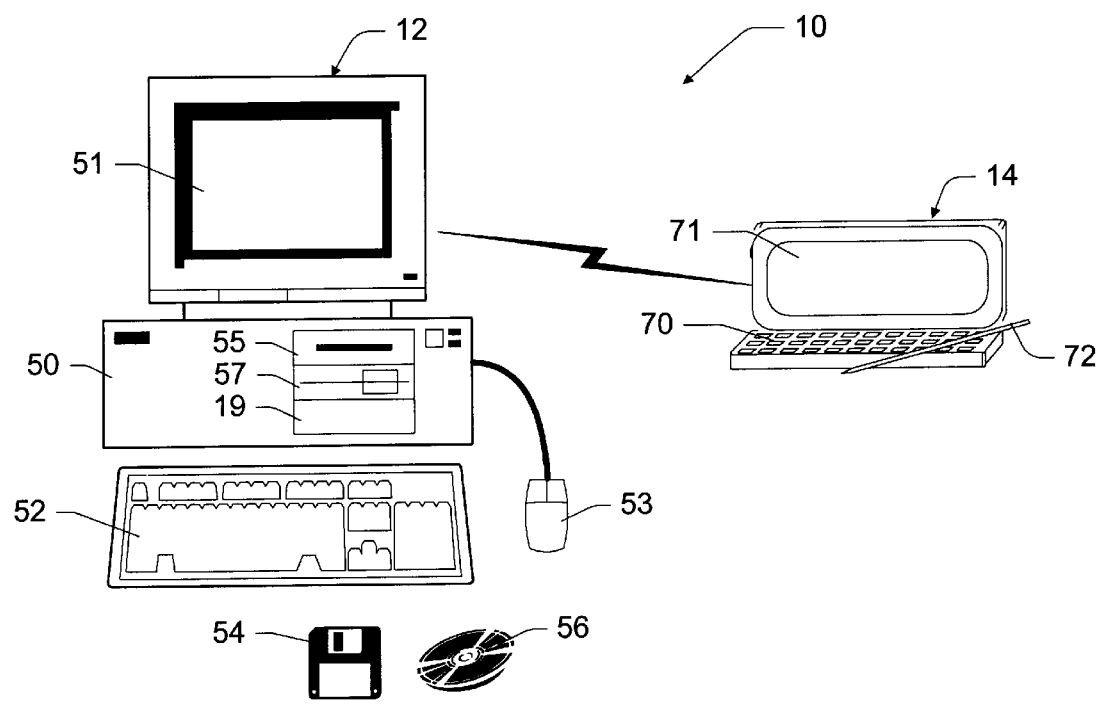
FIGS. 1 and 2 show a computer system 10 in accordance with the invention.
Figure 2:
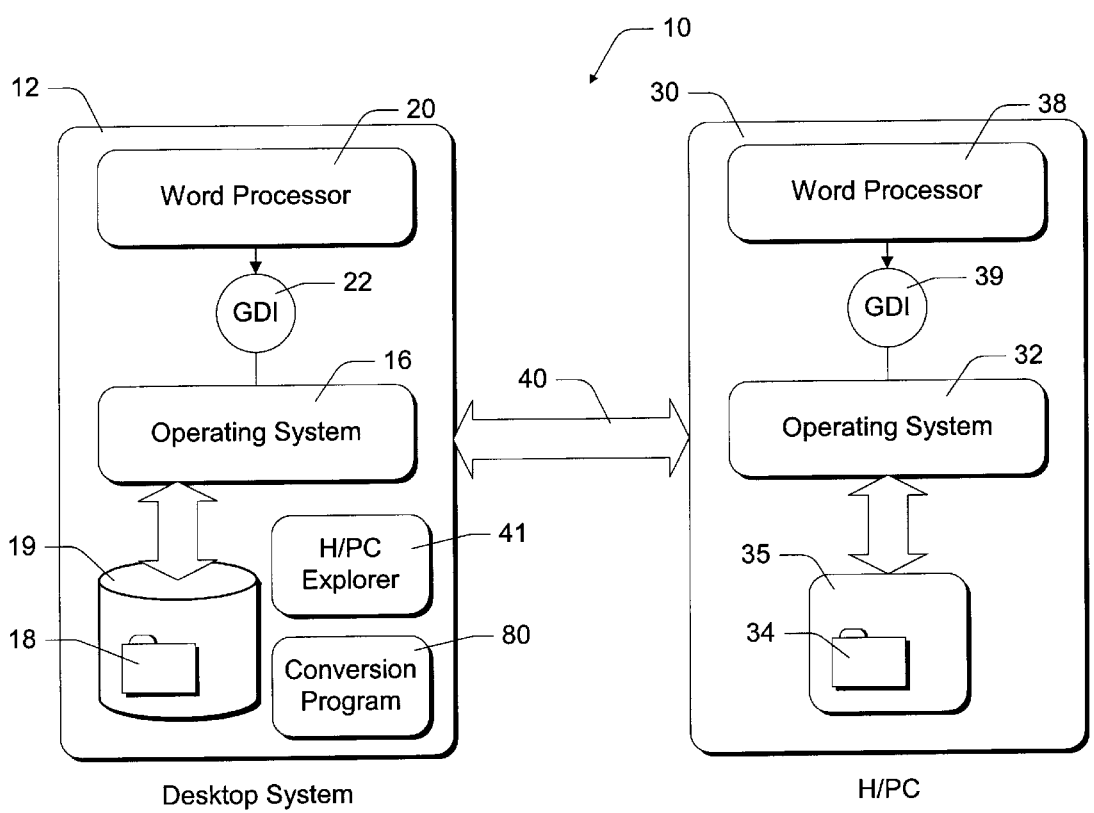

FIG. 1 shows a system 10 that includes a primary, desktop computer 12 and an auxiliary, portable computer 14. FIG. 2 shows pertinent components of the computers in block form.

The primary computer 12 runs an operating system 16 such as the Windows 95 operating system 16. The operating system has access to and makes extensive use of outline fonts such as TrueType fonts. These fonts are stored in a designated folder or directory 18 of a non-volatile storage medium such as a hard disk 19. One or more application programs such as a word processor 20 execute on the primary computer, and make use of TrueType fonts through a graphics device interface (GDI) 22 exposed by the operating system. In this case, the GDI is a standard part of the operating system. Specifically, it is part of the Win32 application program interface (API) supported by current Windows operating systems. GDI 22 provides application programs with a device-independent interface to the screen and printers, providing a layer between the application programs and the different types of hardware. Such an architecture frees programmers from having to deal with each type of device directly, by letting the GDI resolve any differences in hardware. The Win32 GDI is documented in Simon, Richard; *Windows 95 Programming API Bible*; Waite Group Press; 1996; which is hereby incorporated by reference.

Specific interfaces and methods in the GDI are executable to render outline fonts for display in conjunction with display devices or printers. The GDI methods also have the capability of rendering outline fonts directly to memory bitmaps.

Auxiliary computer 14 is implemented as a portable information device, referred to herein as a handheld personal computer (H/PC). For purposes of this description, the term "portable information device" means a small computing device having a processing unit that is capable of running one or more application programs, a display, and an input mechanism that is typically something other than a full-size keyboard. The input mechanism might be a keypad, a touch-sensitive screen, a stylus, a track ball, a touch-sensitive pad, a miniaturized QWERTY keyboard, or the like. In other implementations, the portable information device may be implemented as a personal digital assistant (PDA), a personal organizer, a palmtop computer, a computerized notepad, or the like.

H/PC 14 runs an operating system 32 such as the Windows CE operating system which, as noted above, does not support TrueType outline fonts. Rather, the operating system uses raster fonts that are stored in a folder or directory 34 of a non-volatile storage medium 35 maintained by the H/PC. In this case, the non-volatile memory is battery-backed RAM rather than a hard disk. Other folders are available for storage of documents and other user files, including files and documents that are downloaded from desktop computer 12. One or more application programs such as a word processor 38 execute on the H/PC and make use of the raster fonts through operating system 32, again using a GDI 39 that isolates the application program from the particular hardware configuration of the H/PC. In this case, the GDI does not support printing, since the portable computer is not intended to be connected directly to a printer.

The two computers communicate with each other via a communications channel or medium 40 such as a physical cable or connection using a serial communications protocol. IR (infrared) communications can alternatively be used. Such communications capabilities are commonly available in desktop and portable computers. If the computers are appropriately configured, connecting them through the communications medium automatically initiates synchronization procedures.

The desktop computer includes an application program 41 referred to as the H/PC Explorer. The user interface presented by this program is similar to the Explorer components that are used with the Windows 95 and Windows NT operating systems. The Explorer program, which executes on the desktop computer, presents a window or series of windows showing system resources on the H/PC. Such resources include folders and files. The Explorer also acts as a transfer program. To copy a file or other resource to the H/PC from the desktop computer, a user locates the resource on the desktop computer using the Windows 95 or Windows NT Explorer component, and then drags the resource into the H/PC Explorer Window. OLE (object linking and embedding) technology is used to locate and retrieve the file, and the file is then sent to the H/PC using communications medium 40.

Referring to FIG. 1, primary desktop computer 12 in the illustrated embodiment is a conventional IBM-compatible computer having a central processing unit (CPU) 50, a display monitor 51, a keyboard 52, and a mouse 53. The computer 12 also utilizes one or more computer-readable storage media such as a hard disk 19 and/or a floppy memory diskette 54 in conjunction with a floppy disk drive 55. Computer 12 also utilizes an optional computer-readable storage medium in the form of an optical storage medium 56, such as a CD-ROM or DVD, in conjunction with a CD-reader or access device 57. Computer 12 might also include another input device in addition to, or in lieu of, the keyboard 52 and mouse 53 including such devices as a track ball, stylus, or the like.

Figure 3:
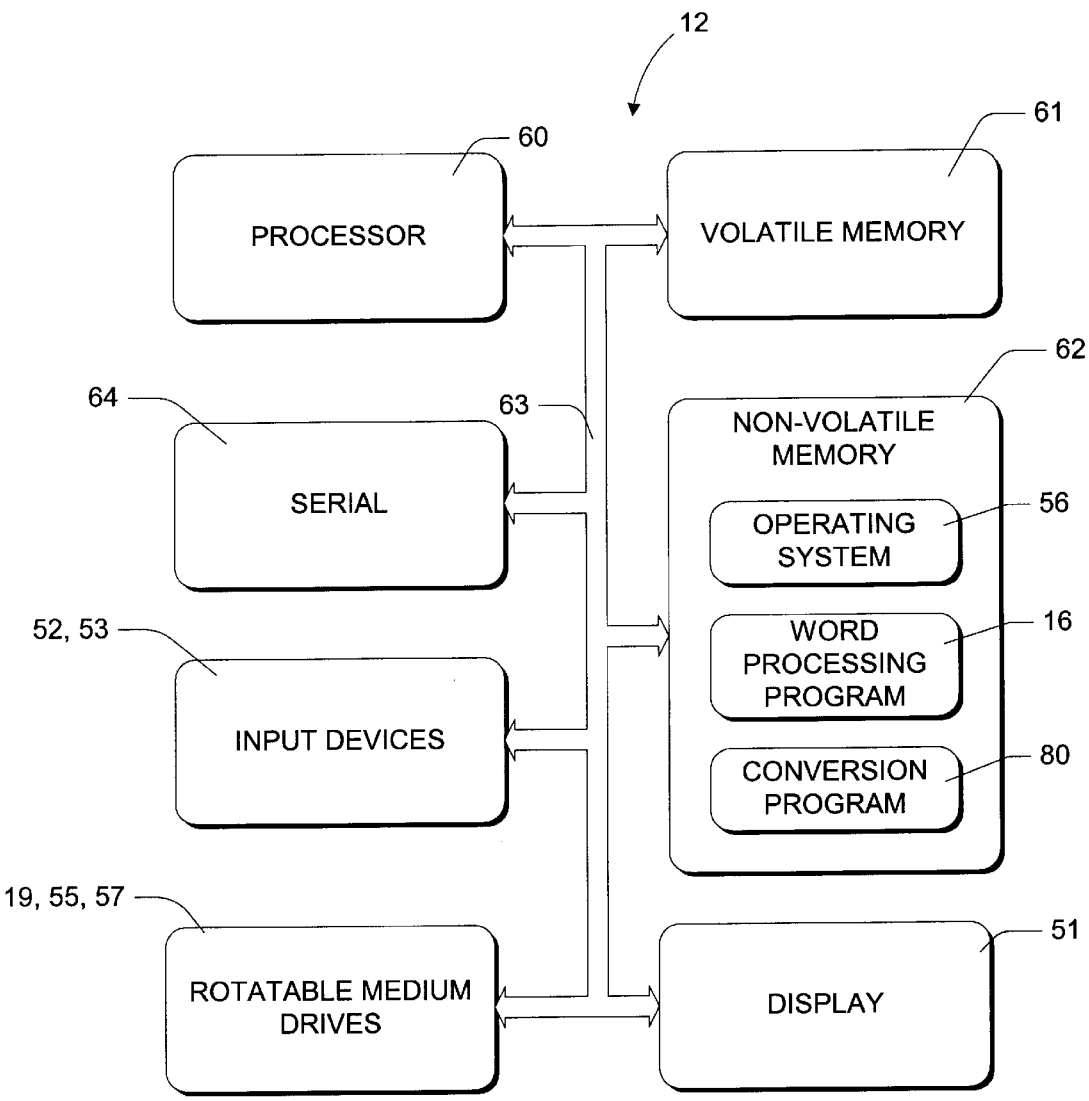
FIG. 3 is a block diagram of a primary computer used in conjunction with the invention.

FIG. 3 shows general components of computer 12 in block form. Computer 12 has one or more processors 60 and one or more forms of computer-readable storage media. Specifically, computer 12 includes a volatile memory 61 (e.g., RAM), and a non-volatile memory 62 interconnected by an internal bus 63. The non-volatile memory 61 can be implemented as integrated circuit chips (e.g., ROM, EEPROM), disk drive(s) (e.g., floppy, optical, hard), or a combination of both.

Display 51 is connected to the bus 63 through appropriate hardware interface drivers (not shown). Additionally, the input devices 52, 53 are connected to supply data to the bus 63 via appropriate I/O ports. Floppy drive 55 and access device 57, and hard drive 19 are also connected through bus 63. Computer 12 includes a serial communications port 64 for communicating with portable information device 14. The serial communications port is connected for communications with processor 60 through bus 63.

Operating system 16 is stored on the non-volatile memory 62 and executes on the processor 60 after being at least partially loaded into volatile memory 61. Word processor 20 and H/PC Explorer 41 are also stored in non-volatile memory 62 and executed on demand from volatile memory 61. Inter-process and inter-program calls are facilitated by using OLE and COM (component object model) as is common in programs written for Microsoft Windows operating systems. OLE and COM are documented in Brockschmidt, Kraig; *Inside OLE* 2; Microsoft Press; 1994; which is hereby incorporated by reference.

H/PC 14 has components similar to those of desktop computer 12, including a miniaturized keyboard 70 and a small LCD display 71 (FIG. 1). Instead of a mouse, H/PC 14 uses a touch-sensitive display screen in conjunction with a stylus 72. The stylus is used to press the display at designated coordinates for user input.

Figure 4:
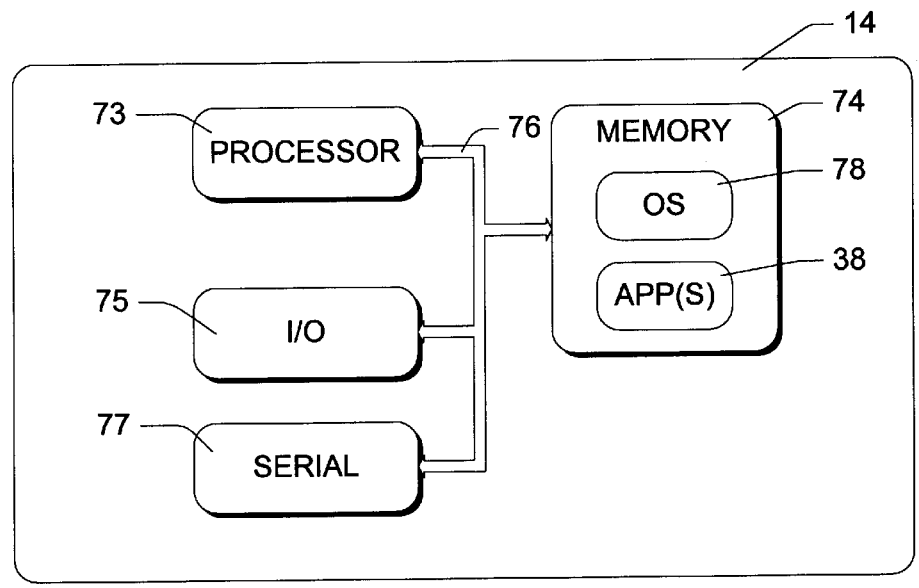
FIG. 4 is a block diagram of an auxiliary computer used in conjunction with the invention.

FIG. 4 shows general functional components of H/PC 14 in block form. H/PC 14 has a processor 73, memory 74, and I/O components 75 (including the display and keyboard). These components communicate over a bus 76. A serial interface 77 is available for communications with desktop computer 12. In current H/PCs, memory 74 is non-volatile electronic memory such as battery-backed RAM. Part of this memory is allocated as addressable memory for program execution, and the remaining part is used to simulate disk storage.

Operating system 78 is loaded in and executes on processor 73 from memory 74 of H/PC 20. Word processor 38 also executes from memory 74 of H/PC 14.

In addition to the components described above, a conversion program 80 is installed in the memory of computer 12. The conversion program is executable to create raster fonts corresponding to selected outline fonts. More specifically, conversion program 80 works in conjunction with H/PC Explorer 41 to convert TrueType outline font files to corresponding raster font files. This behavior happens automatically when a user drags an icon representing a TrueType font file into the H/PC Explorer window. Before actually copying the file, the H/PC Explorer invokes conversion program 80 and converts the outline font file to a raster font file. The raster font file is then copied to the font folder 34 of the H/PC, rather than the originally-specified outline font file. As part of the conversion, the conversion program displays a prompt asking the user to select from a plurality of available font sizes for conversion. Raster fonts are created and copied for any specified font sizes. The conversion program uses GDI 22 to rasterize individual glyphs of the outline font.

Figure 5:
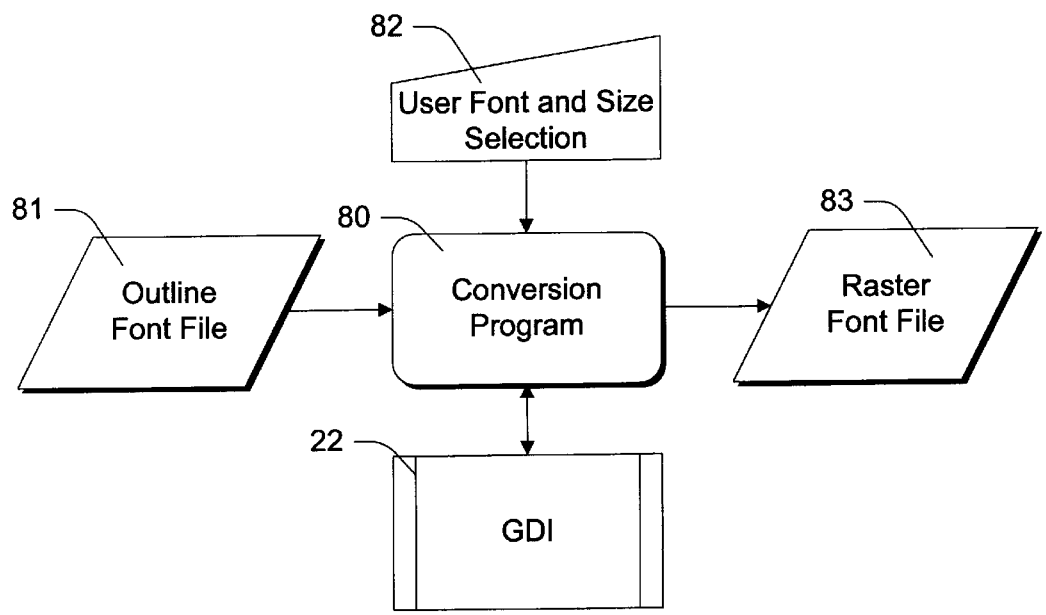
FIG. 5 is a process diagram illustrating font conversion in accordance with the invention.

FIG. 5 illustrates the process performed by conversion program in converting font files. In response to being invoked by H/PC Explorer 41, the conversion program reads an outline font file 81 that has been selected by the user in conjunction with H/PC Explorer 41. The outline font file comprises a plurality of glyphs stored in a computer-readable format such as TrueType format. The conversion program also displays a font size selection dialog 82, prompting the user to select one or more font sizes for conversion.

The conversion program then performs steps of rasterizing individual glyphs from the selected outline font file and of compiling and formatting the rasterized glyphs into a raster font file 83. The raster font file 83 is then installed on auxiliary computer 14. If more than one font size is selected, these steps are repeated to form more than one raster font file.

In the embodiment described herein, the rasterizing step is performed by rendering glyphs as bitmaps to one or more memory regions. More specifically, this is done by rendering individual glyphs to a device context maintained by GDI 22 of operating system 16.

The specific steps involved in rendering an outline font glyph as a bitmap involve:

creating a memory bitmap with the Win32 function CreateCompatibleBitmap;

creating a device context by using the Win32 function CreateCompatibleDC;

selecting the created bitmap into the created device context using the Win32 function SelectObject;

rendering a single character or glyph into the device context and bitmap with the Win32 function ExtTextOut;

reading or examining individual pixels of the bitmap with the Win32 function GetPixel.

After a character glyph has been rendered in this way, the bitmap pixels define a rasterized glyph. The compiling and formatting steps consist of reading bitmaps from the device context after rendering glyphs into them, and arranging the bitmaps in a raster font file in accordance with a predefined raster font file format. The raster font file is then installed on the auxiliary computer by copying the raster font file to folder 32.

Figure 6:
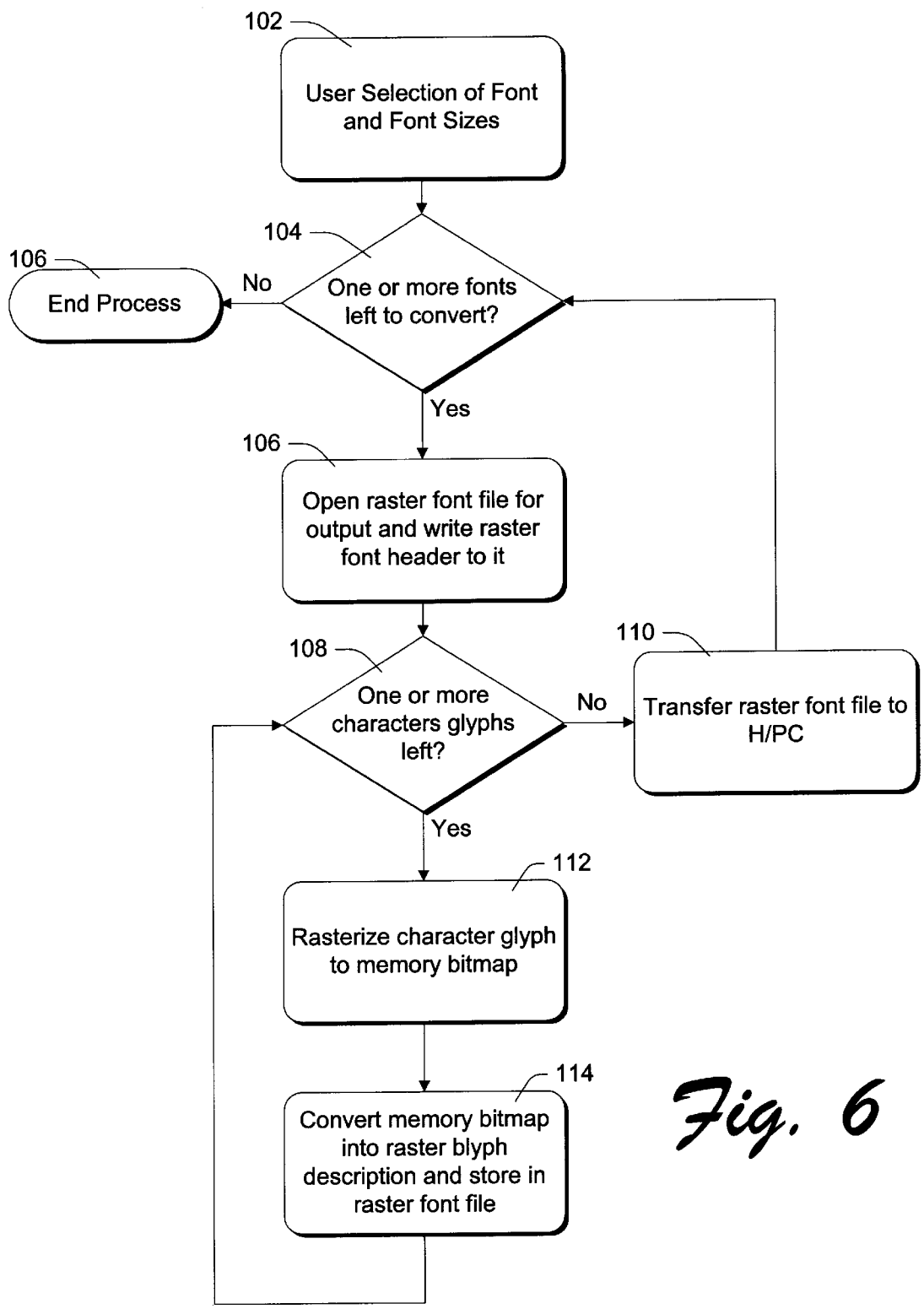
FIG. 6 is a flowchart illustrating exemplary steps in accordance with the invention.

FIG. 6 illustrates this process in the form of a flowchart. A step 102 comprises a step performed by a user of selecting a font and a font size for conversion. In the described embodiment, a plurality of fonts and font sizes can be selected. A step 104 comprises a step of determining whether all selected fonts have been converted. If they have, the process ends, as indicated by block 106. If fonts remain for conversion, a step 106 is performed of opening a new raster file and preparing its header.

A step 108 comprises determining whether more character glyphs are left for conversion. If no more glyph are left, a step 110 is performed of transferring the raster file to the H/PC and then returning to step 104. If more characters remain for conversion, a step 112 is performed of rasterizing an individual character glyph to a memory bitmap. A subsequent step 114 comprises converting the memory bitmap into a raster glyph description and storing the resulting raster glyph in the raster font file. Execution then returns to step 108.

When performing this process, some care must be exercised to capture an entire character in spite of its "overhang."

TrueType fonts are specified in terms of a nominal width. However, TrueType characters are allowed to extend beyond their actual width by an amount referred to as an overhang. Overhang is specified for both the left and right directions. Overhang allows the horizontal edges of certain characters to share the same horizontal space. When rendering a TrueType character to a bitmap and reading the results, care must be taken to capture the entire character, including the overhang on both sides. The actual width of the raster font character will include the overhang, since raster font file formats do not provide for overhang.

The invention provides an efficient solution to the problems presented when transferring documents between computers using outline fonts and raster fonts, respectively. Specifically, the invention allows a user to select specific outline fonts and font sizes that he or she uses frequently, and to convert those fonts for use directly on a computer that has no provision for outline fonts. This is a needed improvement over the prior art.

Although the invention has been described in language specific to structural features and/or methodological steps, it is to be understood that the invention defined in the appended claims is not necessarily limited to the specific features or steps described. Rather, the specific features and steps are disclosed as exemplary forms of implementing the claimed invention.

I claim:

1. A method of sharing resources between first and second computers, wherein the first computer uses outline fonts and the second computer uses raster fonts, wherein a font comprises a plurality of glyphs stored as a computer-readable file, the method comprising the following steps:

rasterizing individual glyphs from a selected outline font file;

compiling the rasterized glyphs into a raster font file; and installing the raster font file on the second computer.

2. A method as recited in claim 1, wherein the rasterizing step comprises rendering glyphs to a device context maintained by an operating system.

3. A method as recited in claim 1, wherein the rasterizing step comprises rendering glyphs as bitmaps to one or more memory regions.

4. A method as recited in claim 1, wherein:

the rasterizing step comprises rendering glyphs to a device context using a graphics device interface of an operating system; and the compiling step comprises reading bitmaps from the device context and arranging the bitmaps in the raster font file in accordance with a predefined raster font file format.

5. A method of sharing resources between a primary computer and an auxiliary computer, wherein the primary computer uses outline fonts and the auxiliary computer uses raster fonts, the method comprising the following steps:

creating a device context in the primary computer using a graphics device interface of the primary computer;

rendering glyphs from a selected outline font to the device context; and reading bitmaps corresponding to the glyphs from the device context and arranging them in a raster font file in accordance with a predefined raster font file format for use on the auxiliary computer.

6. A method as recited in claim 5, further comprising a step of installing the raster font file for use by the auxiliary computer.

7. A computer that has access to outline fonts, comprising:

one or more processors;

a graphics device interface that is executable by the one or more processors to render outline fonts for display; and a conversion program that is executable by the one or more processors to create a raster font corresponding to a selected outline font, wherein the conversion program uses the graphics device interface to rasterize individual glyphs of the selected outline font.

8. A computer as recited in claim 7, further comprising:

a communications channel for communicating with an auxiliary computer; and a transfer program that sends the raster font to the auxiliary computer.

9. A computer-readable storage medium containing instructions that are executable by one or more computers to perform steps comprising:

rasterizing individual glyphs from a selected outline font;

compiling the rasterized glyphs into a raster font file; and installing the raster font file for use by a particular computer.

10. A computer-readable storage medium as recited in claim 9, wherein the rasterizing step comprises rendering glyphs to a device context maintained by an operating system.

11. A computer-readable storage medium as recited in claim 9, wherein the rasterizing step comprises rendering glyphs as bitmaps to one or more memory regions.

12. A computer-readable storage medium as recited in claim 9, wherein:

the rasterizing step comprises rendering glyphs to a device context using a graphics device interface of an operating system; and the compiling step comprises reading bitmaps from the device context and arranging the bitmaps in the raster font file in accordance with a predefined raster font file format.

* * * * *